UNITED STATES PATENT OFFICE.

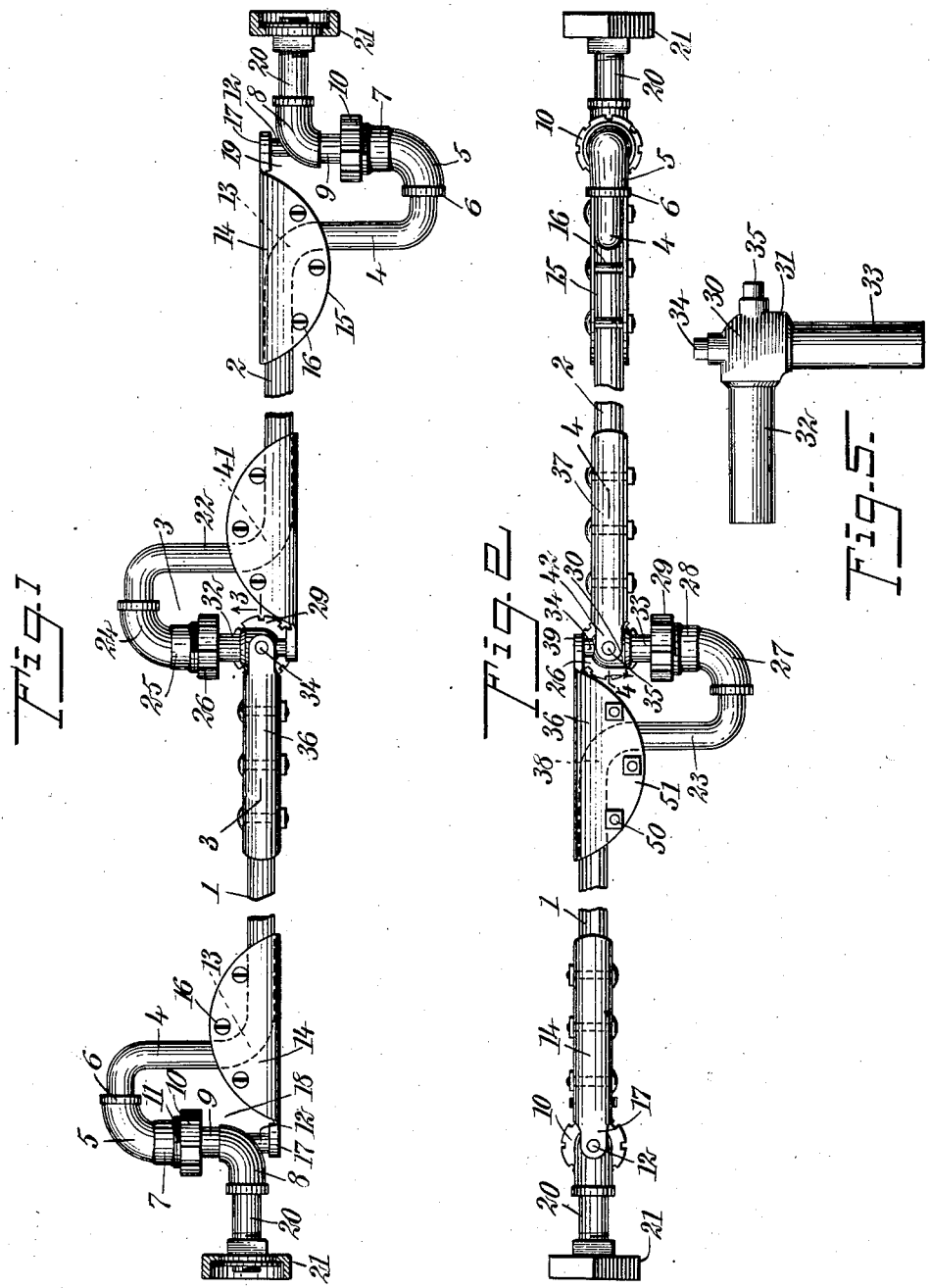

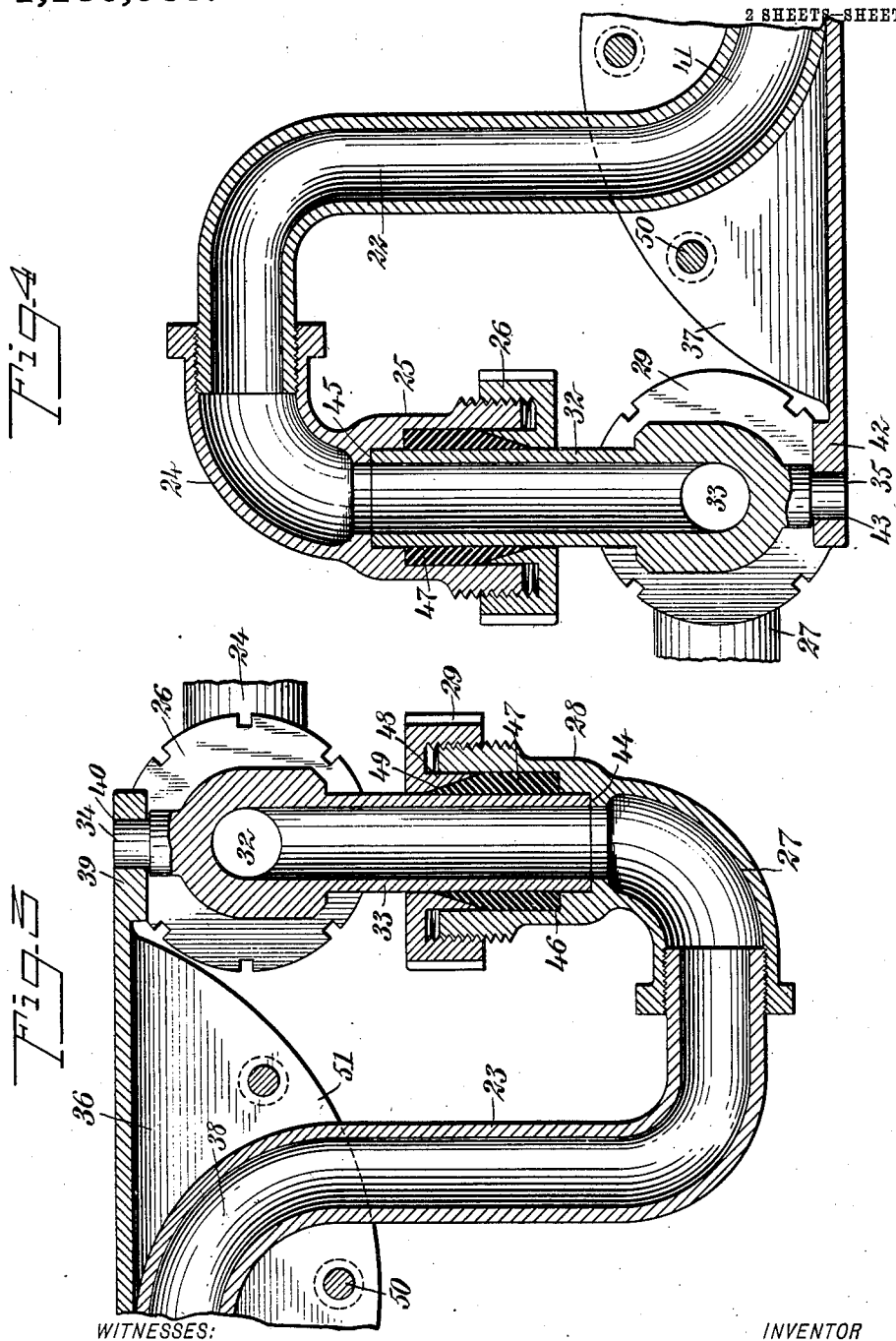

JOSEPH MICHEAL DORAN, OF OGDEN, UTAH.

TRAIN-PIPE.

1,130,965.  Specification of Letters Patent.  Patented Mar. 9, 1915.

Application filed May 5, 1913. Serial No. 765,484.

*To all whom it may concern:*

Be it known that I, JOSEPH M. DORAN, a citizen of the United States, and a resident of Ogden, in the county of Weber and State of Utah, have invented a new and Improved Train-Pipe, of which the following is a full, clear, and exact description.

This invention relates to train pipes, and concerns itself especially with the construction of a connection to be placed between adjacent cars.

The invention is intended to be used especially for conducting steam, water, gas or air throughout the cars of a train. While the invention is intended to be used especially for connecting cars, the construction is such as to enable it to be adapted for forming a pipe connection between bodies which have a vibration or relative motion with respect to each other.

More specifically, the object of the invention is to provide a pipe connection having movable joints of improved construction, adapting the connection to the purposes stated above.

The invention consists in the construction and combination of parts to be more fully described hereinafter and definitely set forth in the claims.

Reference is to be had to the accompanying drawings forming a part of this specification, in which similar characters of reference indicate corresponding parts in all the figures.

Figure 1 is a plan of the complete pipe-connection as used to couple the pipes of two adjacent cars; portions of this connection are broken away, and shown in section; Fig. 2 is a side elevation of the pipe connection, certain parts being broken away; Fig. 3 is a vertical section upon an enlarged scale, taken on the line 3—3 of Fig. 1, and looking in the direction of the arrow; Fig. 4 is a horizontal section taken on the line 4—4 of Fig. 2, and looking in the direction of the arrow; this view is also upon an enlarged scale; and Fig. 5 is a side elevation of a main elbow, which constitutes a feature of the invention.

Referring more particularly to the parts, 1 and 2 represent pipe-sections, which are coupled together by means of a special joint 3, and which are attached at their outer extremities to the forward and rear cars to be coupled together. The extremities of the pipe-sections 1 and 2 remote from the joint 3 are provided with lateral offsets 4, which preferably extend in opposite directions, as shown, and to these offsets elbows 5 are attached. The legs 6 of the elbows 5 are disposed parallel with the pipe connections, and the legs 7 thereof extend at right angles to the pipe sections and project toward them, as indicated. In the legs 7 of the elbows 5 auxiliary elbows 8 are attached, the said elbows 8 having legs 9 which project into the legs 7, as will be readily understood. These legs 9 of the auxiliary elbows are held in the elbows 5 by means of coupling nuts 10 of suitable construction, the said nuts being mounted upon upset threads 11 formed on the elbows 5, as indicated. It should be understood that the axes of the legs 7 are horizontal and disposed at right-angles to the vertical plane passing through the pipe-sections 1 and 2. On its outer side each of the elbows 8 is provided with a laterally projecting gudgeon 12, which is of cylindrical form, as shown, and coaxial with the leg 9 of each elbow. At the bends 13 of the pipe-sections 1 and 2, where the offsets 4 are formed, I attach brackets 14, which consist preferably of circular plates bent so as to form oppositely disposed flanges 15; in this way the brackets constitute U-shaped saddles, as it were, which are adapted to be applied at the bends in the manner illustrated. By means of bolts 16, or similar fastening devices which connect these flanges 15, the brackets or saddles 14 may be securely attached to the pipe-sections, as shown. When so attached, the extremities of the saddles project in the direction in which the main part of the pipe extends, and these projecting portions are provided with projecting ears 17, the purpose of which will now appear. The ears 17 are provided with openings, which will be described more fully hereinafter, and these openings receive the gudgeons 12 so as to support the elbows 8 rotatably. In this connection, it should be understood that the legs 7 of the elbows 5 are rotatable upon the elbows 8, and in this way joints 18 and 19 are formed in the pipe-connection, permitting a relative movement at these points in a vertical plane. The elbows 8 are each attached to nipples 20, to the extremities of which coupling nuts 21 are attached, which enable the nipples to be readily attached to the extremities of the pipe which project at the adjacent ends of the cars which are to be coupled together.

The joint 3 referred to above, and which constitutes the main joint of the pipe-connection, will now be described. Referring to Fig. 1, I provide the pipe-section 2 with a lateral offset 22, and I provide a similar offset 23 in the adjacent extremity of the pipe-section 1, as shown in Fig. 2, but while the offset 22 projects laterally in a horizontal plane, the offset 23 is formed downwardly in a vertical plane. To the extremity of the offset 22 an elbow 24 is attached, the same having a leg 25 projecting toward the body of the pipe, and this leg is provided with a suitable coupling-nut 26, as indicated. A similar elbow 27 is attached at the extremity of the offset 23, and this elbow is formed with an upwardly projecting leg 28, the same being provided with a coupling-nut 29. It should be understood that with the construction described, there is presented the elbow 24, the axis of which lies in a horizontal plane projecting toward the body of the pipe; and there is also presented the elbow 27 projecting vertically toward the body of the pipe. In the legs 25 and 28, which present themselves thus, I mount a main elbow 30, the construction of which is shown most clearly in Fig. 5. This elbow comprises a body 31 with laterally projecting legs 32 and 33, which are received respectively in the legs 25 and 28 of the elbows 24 and 27. It should be understood that the legs 32 and 33 of the elbow 30 are not rigidly secured in the elbows 24 and 27, but are adapted to rotate therein, from which arrangement a universal joint results; thus, if a rotation should take place upon the axis of the leg 32, a relative movement of the pipe-sections 1 and 2 will occur in a vertical plane, whereas if a rotary movement should take place upon the axis of the leg 33, a relative movement of the pipe-sections will occur in a horizontal plane. Opposite to the leg 33, the body 31 of the elbow 30 is provided with a gudgeon 34, the same being located upon the axis of the leg, as will be readily understood, and a similar gudgeon 35 is provided, which is in axial alinement with the leg 32. These gudgeons enable the universal joint referred to, to be completed by means of U-shaped brackets or saddles 36 and 37, which are similar to the brackets 14 described above. The bracket 36 is applied at the bend 38 of the pipe section 1, which lies adjacent to the offset 23. It is provided with a projecting ear 39 formed with an opening 40, which receives the gudgeon 34 in a manner indicated most clearly in Fig. 3. The bracket or saddle 37 is applied as shown at the bend 41 which lies adjacent to the offset 22 of the pipe-section 2, and this saddle is likewise provided with a projecting ear 42 having an opening 43, which receives the gudgeon 35, as shown. In this way, the elbow 30 is securely held in position, and two axes of rotation are presented which correspond to the axes of the legs 32 and 33. Referring to Figs. 3 and 4, which show upon an enlarged scale the details of the construction at this point, it will be seen that the extremities of the legs 32 and 33 seat against shoulders 44 and 45, which are formed within the elbows 27 and 24. The legs 25 and 28 of the elbows 24 and 27 are enlarged so as to form stuffing-boxes 46, in which suitable packing 47 is placed, said packing being held in position by means of the nuts 26 and 29, as will be readily understood. In this connection, it should be stated that the nuts 26 and 29 are formed with central sleeves 48, so that they constitute glands for engaging the packing, as shown. These sleeves 48 are preferably conically bored internally, as indicated at 49, so that when the nuts are screwed up they operate to press the packing tightly against the legs of the elbow, as will be readily understood. It should be noted that the openings referred to in connection with the ears 17 of the bracket 14, are similar to the openings 40 and 43 just described in connection with the saddles 36 and 37. Furthermore, in all respects the saddles 36 and 37 are identical with the saddles or brackets 14, and are secured in position by means of bolts 50, similar to the bolts 16, which pass through the flanges 51 of the saddles or brackets, as shown.

When applying the connection in practice, to unite the train pipes of two adjacent cars, the connection should be made of sufficient length to enable it to sag downwardly slightly at its main joint 3; from this arrangement, the connection adapts itself for extension as well as for contraction of length.

From the foregoing description it will be apparent that swivel joints are formed at the legs 9 of the auxiliary elbows 8, the axes of which lie in a horizontal plane. These joints, in connection with the corresponding swivel joint formed at the leg 32, enable the connection to extend or contract in a vertical plane, as described. The swivel joint which is formed on the axis of the leg 33 enables the pipe-sections 1 and 2 to move freely with respect to each other in a horizontal plane. The aforesaid movements or adaptations of the pipe-sections which occur in a vertical plane adapt the connection for unevenness in the roadbed, and also for curves moved over by the train; while the motions which are possible in a horizontal plane adapt the connection especially for the passing of curves.

While the invention is intended to be used especially for completing train pipes, it is capable of use in many situations where it is desirable to form a jointed pipe connection between members having some movement relative to each other.

Having thus described my invention, I claim as new and desire to secure by Letters Patent:—

1. A pipe connection, comprising a pipe section having at one extremity a lateral offset, an elbow attached to the offset, a main elbow mounted to turn in the first elbow and provided with a gudgeon, a nipple mounted in the main elbow and having a coupling nut at its end, and a U-shaped saddle secured to the pipe section at the bend thereof and provided with an opening receiving the gudgeon of the main elbow.

2. A pipe connection, comprising a pipe section having at one end a lateral offset, an elbow attached to the offset, a main elbow connected to turn in the first elbow and provided with a gudgeon, and a U-shaped saddle straddling and secured to the pipe section at the bend thereof, said saddle being provided with an apertured ear into which the gudgeon of the main elbow projects.

3. A pipe-connection comprising pipe-sections having offsets at their adjacent extremities, elbows carried by said offsets and projecting substantially at right angles to each other, a main elbow having legs rotatably mounted in said first elbows and having gudgeons on the outer side thereof opposite said elbows, and U-shaped brackets rigidly attached to said pipe-sections adjacent to said offsets and having openings receiving said gudgeons.

In testimony whereof I have signed my name to this specification in the presence of two subscribing witnesses.

JOSEPH MICHEAL DORAN.

Witnesses.
 BRUNO LANGE,
 LEONA EVANS.